United States Patent [19]

Francis et al.

[11] Patent Number: 5,615,913
[45] Date of Patent: Apr. 1, 1997

[54] HYBRID INFLATOR WITH INTEGRAL DIFFUSER

[75] Inventors: Joseph D. Francis; Daniel L. Steimke, both of Ogden, Utah

[73] Assignee: Morton International, Inc., Chicago, Ill.

[21] Appl. No.: 597,598

[22] Filed: Feb. 6, 1996

[51] Int. Cl.⁶ .................................. B60R 21/28
[52] U.S. Cl. ........................................ 280/740
[58] Field of Search .................. 280/728.2, 740

[56] References Cited

U.S. PATENT DOCUMENTS

| | | | |
|---|---|---|---|
| 3,232,481 | 2/1966 | Hebenstreit | 222/3 |
| 3,552,770 | 11/1968 | Berryman | 280/740 |
| 3,655,217 | 4/1972 | Johnson | 280/737 |
| 3,756,621 | 9/1973 | Lewis et al. | 280/741 |
| 4,941,678 | 7/1990 | Lauritzen et al. | 280/732 |
| 5,335,940 | 8/1994 | Cueves | 280/737 |
| 5,350,192 | 9/1994 | Blumenthal | 280/737 |
| 5,351,989 | 10/1994 | Popek et al. | 280/740 |
| 5,360,232 | 11/1994 | Lowe et al. | 280/741 |
| 5,456,489 | 10/1995 | Rose et al. | 280/741 |
| 5,456,492 | 10/1995 | Smith et al. | 280/737 |
| 5,458,364 | 10/1995 | Mueller et al. | 280/736 |
| 5,468,012 | 11/1995 | Mihm | 280/728.2 |
| 5,470,104 | 11/1995 | Smith et al. | 280/737 |
| 5,529,333 | 6/1996 | Rizzi et al. | 280/740 |

*Primary Examiner*—Kenneth R. Rice
*Attorney, Agent, or Firm*—Gerald K. White

[57] ABSTRACT

The invention replaces the diffuser that is slid over a non-symmetrical gas output inflator, or diffuser as part of the module assembly, with concentric low cost and low mass rings that are pressed onto the gas outlet area of the inflator. The concentric rings straighten the gas flow coming out of the inflator and serve also to cool the gas flow at the source instead of downstream.

10 Claims, 1 Drawing Sheet

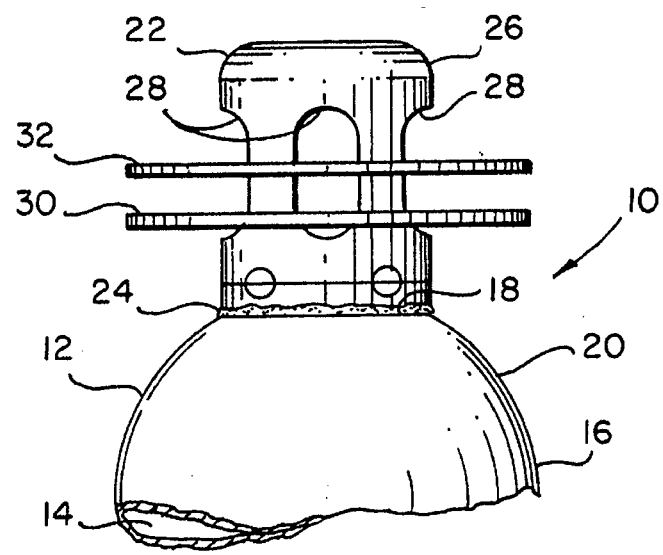
FIG. 1
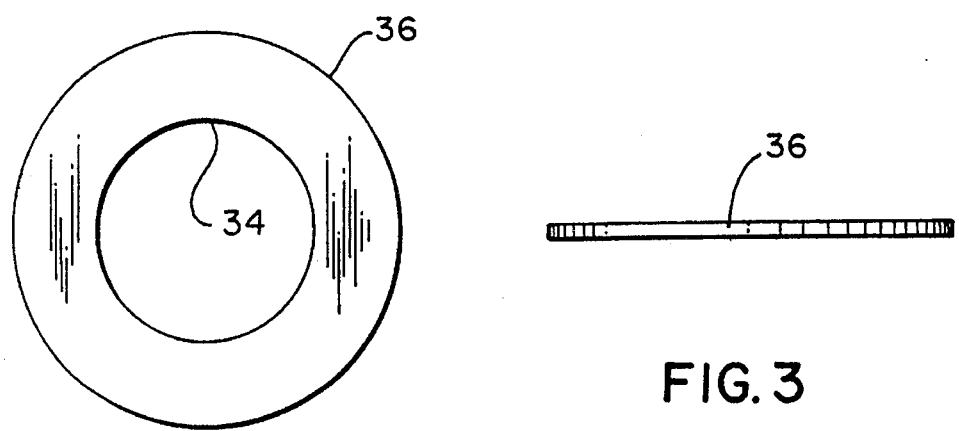
FIG. 2
FIG. 3

HYBRID INFLATOR WITH INTEGRAL DIFFUSER

BACKGROUND OF THE INVENTION

1. Field of the Invention

The present invention relates to passenger air bag modules that use non-symmetrical gas output inflators such as hybrid inflators. Such inflators are elongated, and typically, feature gas flow from one end only. This causes non-symmetrical gas flow through the module assembly, and as a consequence, crooked deployment of an air bag inflated thereby as viewed from the seat of the passenger.

2. Description of the Related Art

In the prior art attention to solving the problem of crooked air bag deployments due to the use of non-symmetrical gas output from a hybrid inflator was not given until after the flowage of the gases from the inflator. The solution effected was by means of a diffuser that was slid over the entire inflator. Such diffuser could be part of inflator assembly or a diffuser that was slid into or was extruded as part of an extruded reaction canister. The diffuser would have a hole pattern based on empirical data that might be tuned for each air bag inflation application. Since the diffuser is as long as the inflator or extruded canister this is a high cost and high mass solution of the problem.

Thus, there has existed a need and demand for a better solution to this problem. The present invention was devised to fill the technological gap that has existed in the art in this respect.

SUMMARY OF THE INVENTION

An object of the invention is to provide close to the source, with low cost and weight, a solution to the air bag crooked deployment problem caused by inflator non-symmetrical output gas flow.

Another object of the invention is to provide a solution to the problem caused by non-symmetrical inflator output gas flow comprising one or more concentric diffuser rings pressed onto the inflator diffuser in order to straighten the gas flow coming out of the inflator.

The invention features one to three low cost and low mass concentric diffuser rings pressed onto the diffuser on the end of a hybrid inflator in order to straighten the gas flow coming out of the inflator.

This invention differs from the prior art in that it straightens and directs the inflator gas directly on out of the inflator diffuser instead of straightening the gas flow further downstream. The invention thus provides a low cost and low mass solution to the crooked deployment of the air bag problem that is caused by the use of non-symmetrical gas output inflators.

The concentric diffuser rings serve also to cool the gas flow at the source of the gas flow from the inflator instead of downstream. Additional cooling can be tuned in by utilizing thicker rings if required due to internal inflator configuration or heat sensitive cushion fabrics.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

DESCRIPTION OF THE DRAWINGS

With this description of the invention, a detailed description follows with reference being made to the accompanying drawings which form part of the specification, of which:

FIG. 1 shows a preferred embodiment of the invention involving a configuration of two spaced concentric diffuser rings mounted on the diffuser of a fragmentarily illustrated elongated hybrid inflator having a longitudinal axis;

FIG. 2 is a plan view of each of the diffuser rings shown in FIG. 1; and

FIG. 3 is an edge view of each of the diffuser rings shown in FIG. 1.

DESCRIPTION OF THE PREFERRED EMBODIMENT

Referring to FIG. 1, there is illustrated in fragmentary form a non-symmetrical gas output inflator assembly 10 such as a hybrid inflator which may be of a type such as that disclosed in U.S. Pat. Nos. 5,360,232, 5,456,489 and 5,458,364, all of which patents are assigned to the assignee of the present invention, and by reference herein are included as part of the disclosure of the present specification. Such hybrid inflators are utilized for inflating a vehicle occupant restraint. It will be understood that the invention described herein has general applicability to various kinds of air bag assemblies for automotive vehicles including vans, pick-up trucks, and particularly automobiles.

The inflator assembly 10 comprises a substantially cylindrical pressure vessel 12 including a storage chamber 14 (shown partially only) that is filled and pressurized with an inert gas such as argon or nitrogen to a pressure typically in the range of 2000–4000 psi.

The chamber 14 is defined by an elongated generally cylindrical sleeve 16 having a first end (not shown) and a second end 18 that is closed by a shoulder portion 20. A gas discharge outlet diffuser assembly 22 is attached by a circumferential weld 24 in sealing relation to the second end 18 of the inflator assembly 10. A combustion chamber assembly (not shown) is attached in a suitable manner in sealing relation to the first end (not shown) of the sleeve 16.

The diffuser assembly 22 comprises a generally cylindrical cap portion 26 that includes a plurality of openings 28, adjacent the second end 18 for dispensing inflation gas from the inflator assembly 10 into an air bag assembly (not shown) upon operation thereof responsively to the onset of a collision.

Non-symmetrical gas output inflators such as the inflators disclosed in the aforesaid U.S. Pat. Nos. 5,360,232, 5,456,489 and 5,458,364, feature gas flow from one end only. This causes non-symmetrical gas flow through the module assembly and crooked bag deployment as viewed from the passenger's seat. According to one embodiment of the invention, in order to straighten the gas flow coming out of the inflator, two concentric diffuser rings 30 and 32 are pressed in spaced relation onto the diffuser assembly 22 of the inflator assembly 10 over the holes 28.

As best shown in FIG. 2, each of the diffuser rings 30 and 32 comprises a flat circular structure and is defined by the space between two concentric circles 34 and 36. The diameter of the inner circle 34 is selected so as to facilitate assembly by pressing of each of the rings 30 and 32 onto the cylindrical cap portion 26 in positioned relation over the plurality of openings 28. The diameter of the outer circle 36 of each of the rings 30 and 32 and the spacing of the rings 30 and 32 are based on empirical data in order to obtain the most effective straightening of the gas flow coming out of the inflator 10. The spacing and diameter 36 of each of the rings 30 and 32 could be tuned for each application.

The rings 30 and 32 can be made from 18 gauge sheet metal, but could be made from a variety of materials and thicknesses. The thickness of the rings may be determined in accordance with the application, varying in either direction from a predetermined thickness of 1/16 of an inch utilized in one embodiment. The diffuser rings serve to cool the gas flow at the source instead of downstream. Additional cooling can be tuned in by utilizing thicker rings, if required due to internal inflator configuration or heat sensitive cushion fabrics.

Thus, in accordance with the invention, there has been provided close to the source a solution to the crooked air bag deployment problem that is caused by inflator non-symmetrical output gas flow.

A significant difference of the invention over the prior art is that it straightens and directs the inflator gas directly out of the inflator instead of straightening the gas flow further downstream. The invention solves the problem of non-symmetrical gas flow close to the source thereof with low cost and low mass (which may be expressed as the quotient of the weight of the body divided by the acceleration due to gravity). There is a significant manufacturing cost saving per module and a significant weight saving. Additionally, the diffuser rings serve to cool the gas flow at the source instead of downstream. Also, additional cooling can be tuned in by utilizing thicker rings, if required due to internal inflator configuration or heat sensitive air bag cushion fabrics.

With this description of the invention in detail, those skilled in the art will appreciate that modifications may be made to the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. In an elongated, substantially, cylindrical, inflator having a longitudinal axis and extending from a first end to a second end and having a gas discharge outlet diffuser assembly at one of said first and second ends, said diffuser assembly comprising a generally cylindrical cap portion having a plurality of openings through which a non-symmetrical output flow of air bag inflation gas is dispensed when said inflator is initiated, the improvement wherein said diffuser assembly includes at least one diffuser ring positioned on said cylindrical cap portion over said openings to straighten and direct the flow of gas directly out of said diffuser assembly.

2. The improvement of claim 1 wherein said diffuser ring comprises a flat circular structure having a predetermined thickness and which is defined by the space between two concentric circles.

3. The improvement of claim 1 wherein said diffuser assembly includes a diffuser ring pressed onto said cylindrical cap portion over said openings to straighten and direct the flow of gas out of said diffuser assembly.

4. The improvement of claim 3 wherein said diffuser assembly includes a plurality of diffuser rings pressed in spaced relation on said cylindrical cap portion over said plurality of openings.

5. The improvement of claim 4 wherein each of said diffuser rings comprises a flat circular structure which is defined by the space between two concentric circles having different diameters, and wherein the diameter of the circle having the smaller diameter is selected so as to facilitate assembly of each of said rings by pressing thereof onto said cylindrical cap portion over said plurality of openings.

6. The improvement of claim 1 wherein said diffuser ring comprises a flat circular structure that is defined by the space between two concentric circles having different diameters, and wherein the diameter of the circle having the smaller diameter is selected so as to facilitate assembly of said ring by pressing thereof onto said cylindrical cap portion over said plurality of openings.

7. The improvement of claim 1 wherein said diffuser ring is made from 18 gauge steel.

8. The improvement of claim 1 wherein in addition to straightening said non-symmetrical output flow of air bag inflation gas through said plurality of openings in said cylindrical cap portion of said diffuser assembly, said diffuser ring, immediately upon exit of said output flow of gas through said openings, cools said output flow of gas.

9. The impovement of claim 8 wherein additional cooling of said air bag inflation gas is tuned in by utilizing a thicker diffuser ring.

10. The improvement of claim 2 wherein the utilization of a diffuser ring of thickness greater than said predetermined thickness effects an increase in the cooling of said air bag inflation gas.

* * * * *